United States Patent [19]

Beller

[11] Patent Number: 5,181,778
[45] Date of Patent: Jan. 26, 1993

[54] ULTRASONIC TOMOGRAPHY FOR IN-PROCESS MEASUREMENTS OF TEMPERATURE IN A MULTI-PHASE MEDIUM

[75] Inventor: Laurence S. Beller, Idaho Falls, Id.

[73] Assignee: EG&G Idaho, Inc., Idaho Falls, Id.

[21] Appl. No.: 767,901

[22] Filed: Sep. 30, 1991

[51] Int. Cl.⁵ .................................. G01K 11/24
[52] U.S. Cl. ........................ 374/119; 374/137; 374/120; 73/597
[58] Field of Search ............... 374/117, 119, 120, 137, 374/147; 364/557; 426/88; 73/584, 603, 620, 597, 624, 625, 628

[56] References Cited

U.S. PATENT DOCUMENTS

| | | |
|---|---|---|
| 2,274,262 | 2/1942 | Wolff .................... 374/119 |
| 3,309,913 | 3/1967 | Weighart . |
| 3,310,977 | 3/1967 | McGaughey . |
| 3,501,956 | 3/1970 | Yamaga et al. ............ 374/119 |
| 3,604,252 | 9/1971 | Beeken .................. 374/119 |
| 4,173,899 | 11/1979 | Perdijon ................ 73/620 |
| 4,181,120 | 1/1980 | Kunii et al. . |
| 4,246,784 | 1/1981 | Bowen . |
| 4,317,370 | 3/1982 | Glen .................... 73/620 |
| 4,478,083 | 10/1984 | Hassler et al. .......... 73/620 |
| 4,478,084 | 10/1984 | Hassler et al. .......... 73/620 |
| 4,509,368 | 4/1985 | Whiting et al. ......... 73/628 |
| 4,513,750 | 4/1985 | Heyman et al. ......... 374/117 |
| 4,523,468 | 6/1985 | Derkacs et al. ......... 73/628 |
| 4,527,147 | 7/1985 | Arisi ................... 374/147 |
| 4,574,636 | 3/1986 | Toshiba . |
| 4,635,198 | 1/1987 | Hohlweck et al. ........ 73/628 |
| 4,655,992 | 4/1987 | McKnight et al. ....... 374/119 |
| 4,663,711 | 5/1987 | Vinegar et al. . |
| 4,691,332 | 9/1987 | Burnstein et al. . |
| 4,754,760 | 7/1988 | Fukukita et al. . |
| 4,762,425 | 8/1988 | Purthaurothy et al. .... 374/117 |
| 4,807,633 | 3/1989 | Fry . |
| 4,819,649 | 4/1989 | Rogers et al. ........... 73/625 |

FOREIGN PATENT DOCUMENTS 134639  6/1986  Japan ................... 374/117

OTHER PUBLICATIONS

C. Javanaud, "Applications of Ultrasound to Food Systems", Received 28 Apr. 1987; revised 18 Jan. 1988, pp. 117-123.

Primary Examiner—William A. Cuchlinski, Jr.
Assistant Examiner—G. Bradley Bennett
Attorney, Agent, or Firm—Alan D. Kirsch

[57] ABSTRACT

A method and apparatus for the in-process measurement of internal particulate temperature utilizing ultrasonic tomography techniques to determine the speed of sound through a specimen material. Ultrasonic pulses are transmitted through a material, which can be a multi-phase material, over known flight paths and the ultrasonic pulse transit times through all sectors of the specimen are measured to determine the speed of sound. The speed of sound being a function of temperature, it is possible to establish the correlation between speed of sound and temperature, throughout a cross-section of the material, which correlation is programmed into a computer to provide for a continuous in-process measurement of temperature throughout the specimen.

10 Claims, 10 Drawing Sheets

ULTRASONIC TOMOGRAPHY FOR IN-PROCESS MEASUREMENTS OF TEMPERATURE IN A MULTI-PHASE MEDIUM

The United States Government has rights in this invention pursuant to Contract No. DE-AC07-76ID01570 between the U.S. Department of Energy and EG&G Idaho, Inc.

BACKGROUND OF THE INVENTION

The present invention relates to a method and apparatus for the non-invasive measurement of internal particulate temperature utilizing ultrasonic tomography techniques.

The food processing industry currently utilizes two different processes for the sterilization and preparation of food products. The first method is commonly referred to as the conventional canning method and has seen little change in nearly 100 years. In the conventional canning method, a container is filled with food materials and sealed. The next step is the retort which is commonly performed in batches. The retort is accomplished by heating the food material to temperatures in the range of 120° to 150° C. (250° to 300° F.) and maintaining the temperature for specified periods of time, typically 5 to 15 minutes. Although the retort step cooks the food, its primary purpose is the destruction of harmful organisms, most notably those responsible for botulism. The time/temperature requirements for a particular food material is determined experimentally for each plant and process, but is also subject to a number of practical constraints which introduce the need for safety factors.

After retort the food product is cooled and a representative number of containers are punctured to determine the internal temperature by the use of a thermometer or thermocouple. The temperature measurement does not assess the internal particulate temperature, but only serves to verify that the process parameters are within acceptable limits. In order to assure that the particulate temperature has been elevated and maintained for an adequate period of time, extremely conservative safety factors are added to the process, such as, processing at a higher temperature or for a longer period of time, or both. As a result, product quality is degraded by overcooking, and a substantial amount of energy is wasted in the process. Additionally, containers that have been punctured must be disposed of at a significant cost to the food processing industry, costs which are ultimate borne by the consumers.

Another method of processing food is called the aseptic process, in which the food materials are pumped continuously through a heat exchanger in order to raise the temperature of the material to a predetermined level and maintain the temperature for a prescribed period of time. The food product is then cooled and finally placed and sealed in pre-sterilized containers. The aseptic process typically uses 10 to 20% of the energy of the equivalent conventional process and produces a better quality product because it does not overcook the product as the conventional canning method does. However, in the United States the aseptic process is only used for products consisting of a single phase, for example, fruit juices and other liquids.

In single phase materials, temperatures can be measured simply and accurately at any desired location in the heat exchanger by thermocouples or similar devices. However, the residence time in the heat exchanger is not well defined since the product which travels through the heat exchanger moves at different speeds, depending upon its proximity to the walls of the heat exchanger. The aseptic process has not yet been approved by the Food and Drug Administration for food materials containing particulates, i.e., multi-phase materials, due to the uncertainties of the temperature of the particulates in the food material and the residence time.

Ultrasonic temperature devices are known which have the capability for the non-invasive measurement of temperature in a single medium. These devices are based upon the principle that the speed of sound in any medium is a function of temperature. In a single phase medium, a through-transmission measurement is performed using one acoustic transducer as a sending element to generate short pulses of sound, and a second transducer to receive the sound pulses. The transmission time between the two is a measure of the speed of sound.

However, when measurements are made on two (or multi-) phase media, the problems involved in relating the measurements to the physical system are far greater. (see C. Javanaud, "Applications of Ultrasound to Food Systems", Ultrasonics, vol. 26, pp. 117–123, May 1988). The problem arises because the speed of sound at a given temperature is a unique function of each material. In general, the speed of sound is different in one material as opposed to another, even when the two materials are at the same temperature. When the acoustic flight path of an ultrasonic pulse is partly in one medium and partly in another, for example liquid and solid, the time of flight is proportional to the average speed of sound in each medium along the flight path. If the location and/or the dimensions of the solid or semi-solid particles along the transmission path are not known, a unique value for the speed of sound through the particle cannot be determined.

Therefore, it is necessary to know the length of flight in each medium, so that the speed of sound and thus the temperature in each medium is known from the overall measurement of the transit time of the ultrasonic pulse. Tomography techniques can be used to determine the length of flight in each medium, and therefore the temperature at a specific point in a non-homogeneous material. The use of ultrasonic tomography for in-process measurements of particulate temperatures in the food processing industry will result in lower energy requirements, reduced costs associated with disposal of unusable product, and will result in a better quality product since overcooking is avoided. Additionally, ultrasonic tomography can be used by the food processing industry for determining the in-process particulate temperatures in freezing operations, thereby reducing energy requirements and costs.

It is an object of this invention to provide a device that measures the internal temperature of particulates during processing.

It is another object of this invention to provide a device that measures the temperature of a multi-phase material at any location within the material.

It is another object of this invention to provide a method for non-invasively determining the temperature in a multi-phase material.

Additional objects, advantages and novel features of the inventions will become apparent to those skilled in the art upon examination of the following and by practice of the invention.

SUMMARY OF THE INVENTION

To achieve the foregoing and other objects, this invention comprises a method and apparatus for determining, by non-invasive means, the temperature of a particle in a multi-phase medium, utilizing speed of sound tomography techniques. A multiple number of ultrasonic transducers, which function as ultrasonic transmitters and/or receivers, are positioned around the material for which the temperature is desired to be known. The transducers are positioned so that all cross sectional grid system cells are traversed by at least two ultrasonic pulses. The multiple number of transducers emit ultrasonic pulses through the medium, and the transit time that it takes the pulse to travel through the medium is measured. From the overall transit times of the pulses through the medium, it is possible to calculate the speed of sound through any given cell within the grid. The temperature can then be derived for a specific cell location based upon previously determined characteristics between the speed of sound and temperature for that particular material.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 also shows an example of a grid system within the medium.

DETAILED DESCRIPTION OF THE INVENTION

The use of tomographic techniques provides a method for determining the effective flight path in each medium of a multi-phase media. The tomographic process is capable of providing a map or image of the cross section of the media being imaged, from which the speed of sound in any small portion can be obtained. However, a map or image is not necessary if the length of the flight path is known and the time of flight is measured. From these two known variables it is possible to calculate the speed of sound through any particular segment of the medium. It is understood that the speed of sound is a function of, inter alia, temperature. Once the speed of sound is known for each segment of the media, the temperature for that segment can be calculated using previously derived characteristics of sound and temperature for that particular medium.

Figure 1:
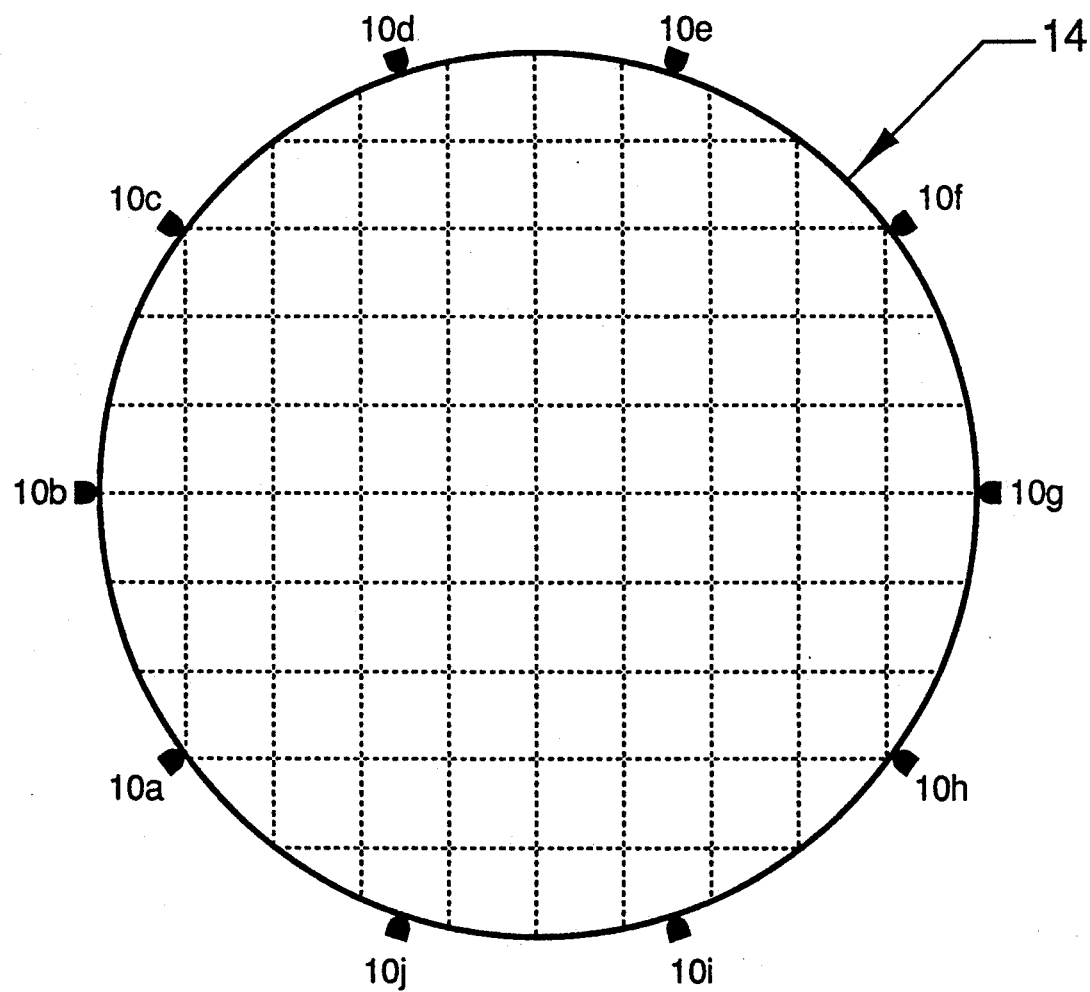
FIG. 1 depicts the potential locations of ultrasonic transducers around a container (e.g. a pipe, can, etc.) of the medium to be measured.

Referring now to the drawings in which like numerals represent like elements throughout the several views, the preferred embodiment of the present invention will be described. FIG. 1 shows a possible arrangement of ultrasonic transducers $10a$-$10j$ around the perimeter of a container 14 of material for which the temperature is desired to be measured. Transducers $10a$-$10j$ can function as both transmitters and receivers of ultrasonic pulses, or the transducers can function strictly as a transmitter or receiver of the pulses. The perimeter of the container can be a pipe through which the material flows, or it could be some other form of container, such as a metal can or plastic bottle. FIG. 1 also depicts an example of a mathematical grid system within the container 14 wherein the grid is composed of small sectors (cells) covering the entire cross section of the specimen material. Each cell represents an area or volume over which the speed of sound is averaged. The quality of the tomographic image, and of the measurement of the speed of sound, depend upon the size of each cell. The image and measurement improve as the cells become smaller, however, smaller cells results in more ultrasonic transducers, additional electronics and greater sensitivity to background "noise". The ultrasonic transducers $10a$-$10j$ are arranged so that at least two ultrasound flight paths will traverse every cell in the grid system.

Figure 2:
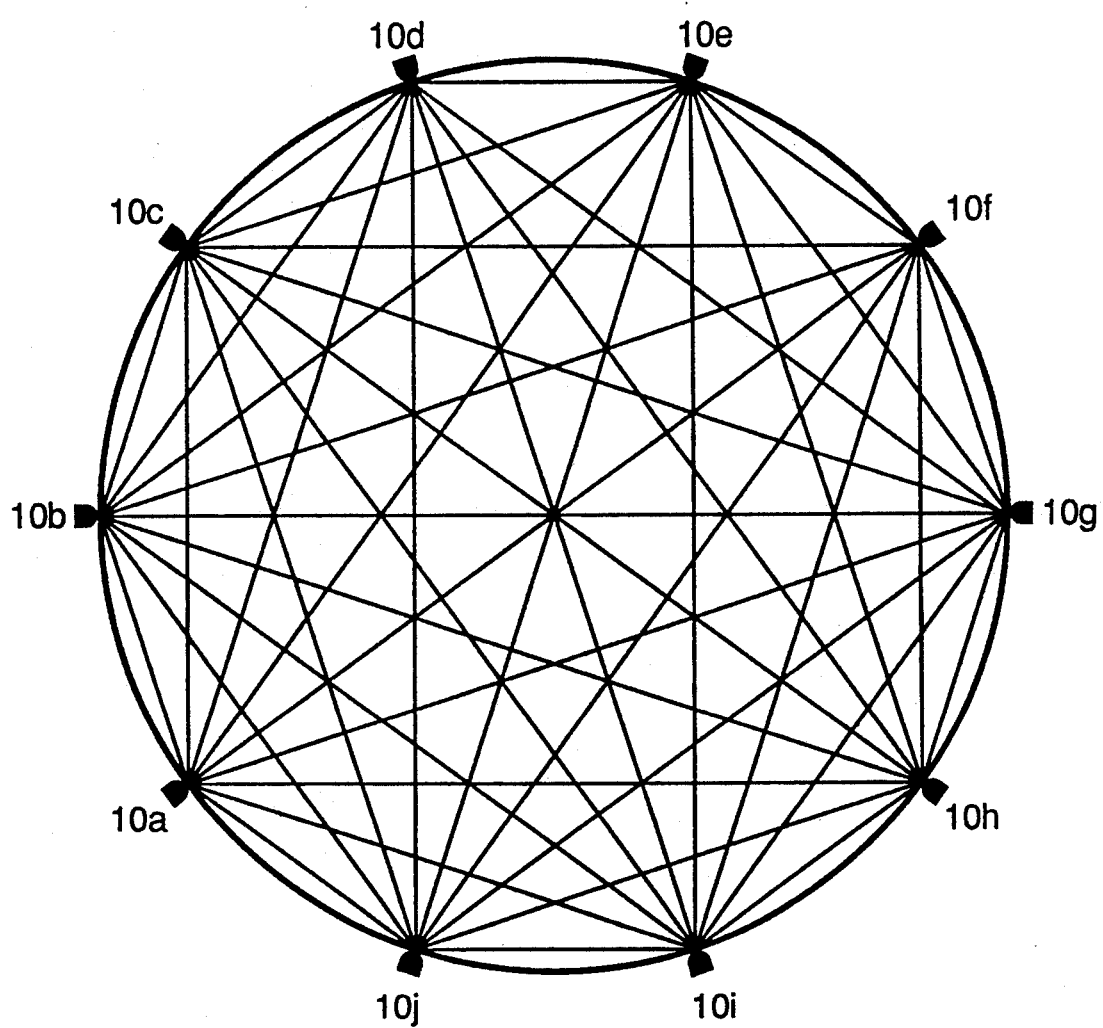
FIG. 2 shows possible flight paths for the ultrasonic pulses between the transducers.
Figure 3:
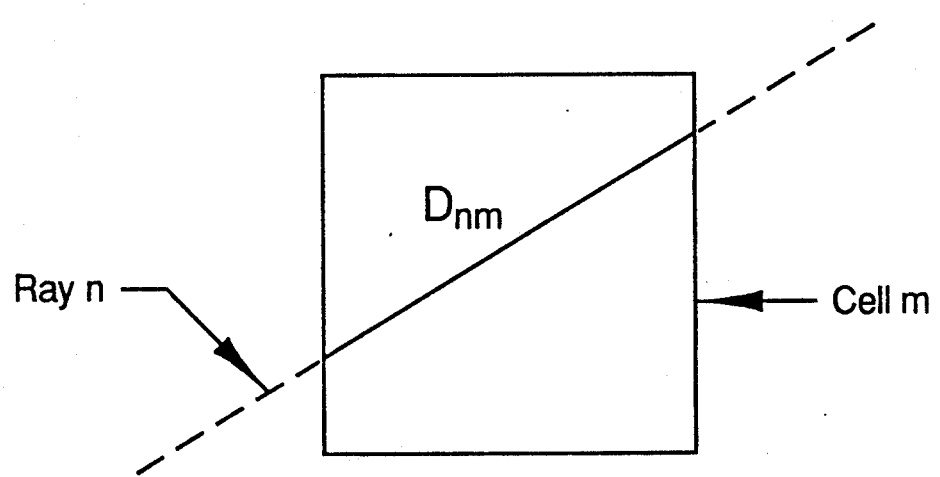
FIG. 3 shows the flight path of an ultrasonic pulse through a particular cell of the grid system.

FIG. 2 shows the flight paths of the ultrasonic pulses that are to be emitted and received by transducers $10a$-$10j$. In the preferred embodiment of the present invention, the frequency of the ultrasonic pulses is the range of 20 kHz to 100 MHz. Depending upon the properties of the specimen to be measured, the frequency of the ultrasonic pulses could be varied. By superimposing the ultrasonic pulse flight paths onto the grid system shown in FIG. 1, it is possible to determine the distance of each flight path through every cell of the grid system, as illustrated in FIG. 3. With the flight path distance through each cell known, the next step is to measure the transit time of the ultrasonic pulses through the media. The transit time of various pulses traversing each cell is assumed constant in that cell.

The next step is to combine the measurements in the mathematical process called tomography to produce the equivalent of an image of the region, if desired, through which the sound beams passed. The mathematical process is a series of linear simultaneous equations of the matrix form:

$$[D_{nm}]*[1/T]=[S]$$

where:
  $D_{nm}$ = the ultrasonic flight path distance of the nth pulse across each mth cell,
  $1/T$ = the inverse transit time of each ultrasonic pulse, and
  $S$ = the speed of sound through each cell.

These equations are solved for the speed of sound in each cell, from which a corresponding temperature can be determined based upon previously derived characteristics between the speed of sound and temperature for the particular medium. Other algorithms could also be used to solve for the speed of sound in each cell.

Figure 4:
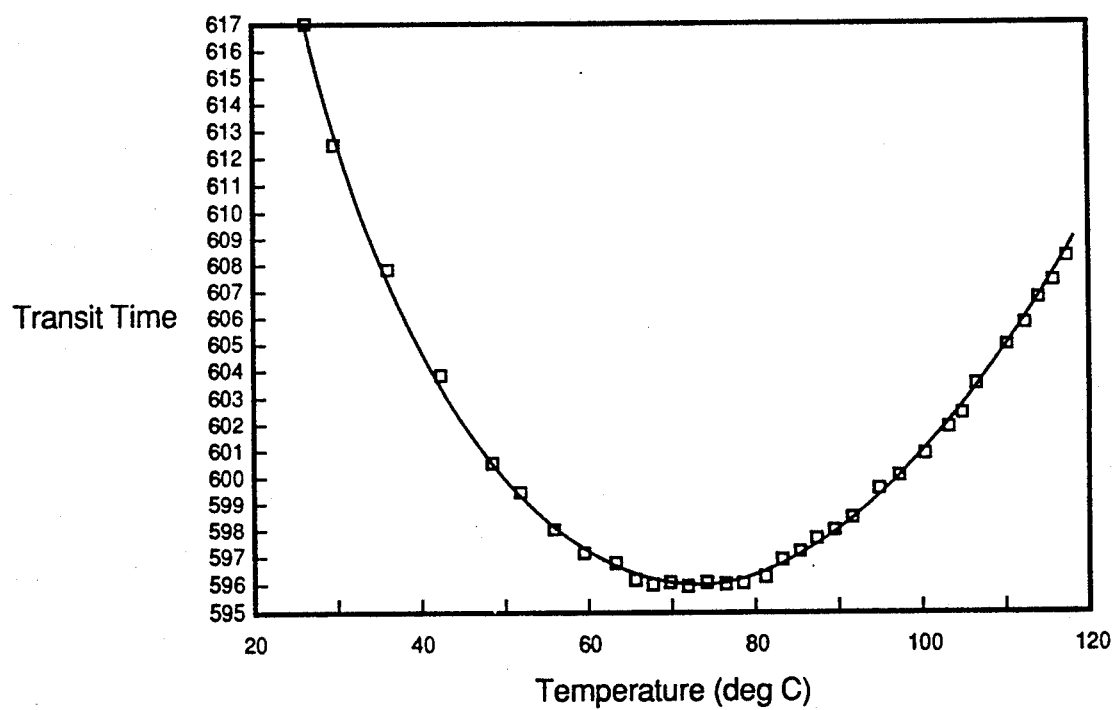
FIG. 4 is a graph showing the transit time characteristics for sound through water at a given temperature.
Figure 5:
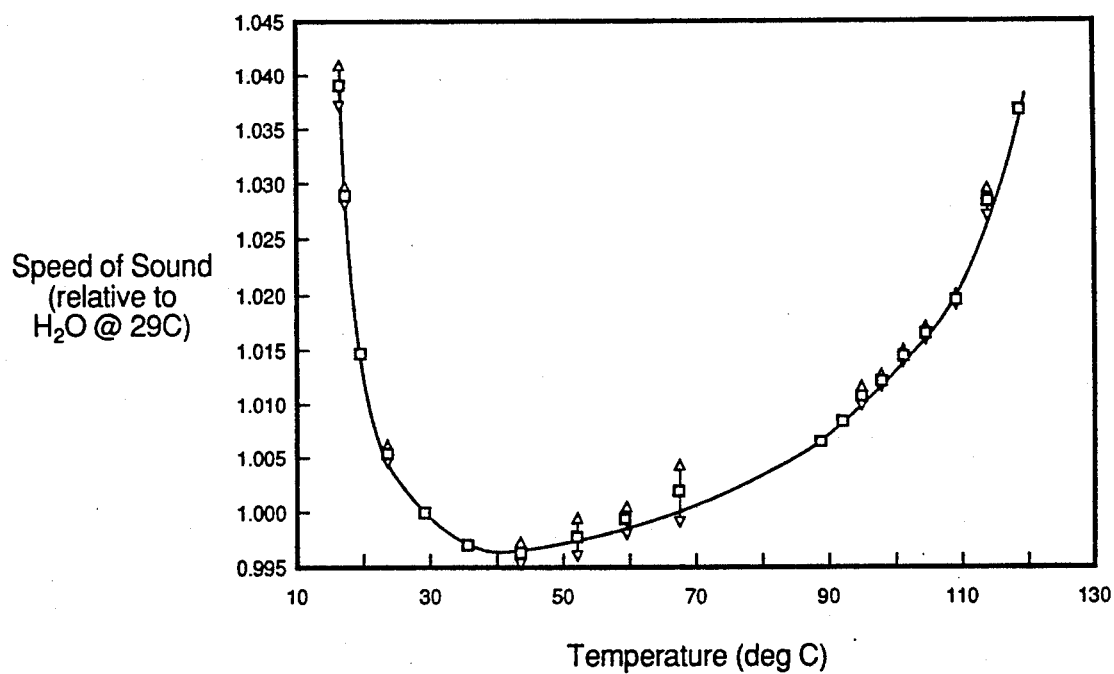
FIG. 5 is a graph showing the transit time characteristics of sound through a solid (i.e., a potato) at a given temperature.
Figure 6:
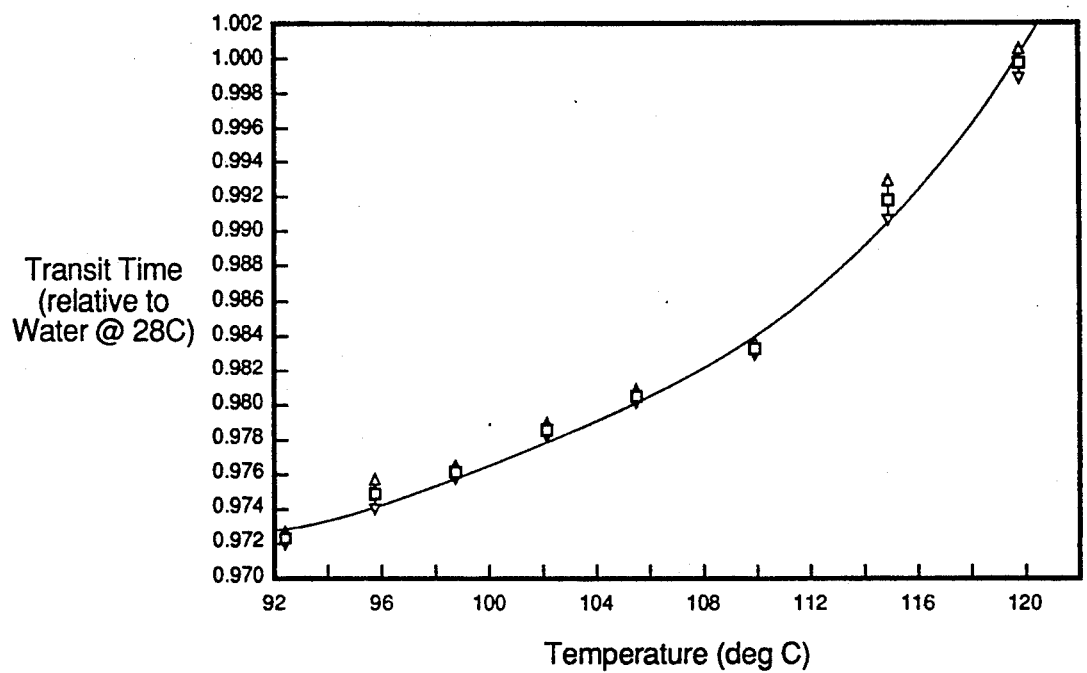
FIG. 6 is a graph showing the speed of sound through a potato immersed in water having a temperature of 28° C.

Individual transit time measurements can easily be made to 0.01% or less under industrial conditions. Uncertainties of this order correspond to errors in temperature measurement of tenths of a degree or less. FIG. 4 illustrates the transit time characteristics for sound in water at any given temperature. These characteristics are derived through experimental procedures for each medium. FIG. 5 shows the transit time characteristics for sound in a solid, in this case a potato, at any given temperature. FIG. 6 shows in greater detail the transit time of sound through a solid (i.e., a potato) which is immersed in water having a temperature of 28° C. Again, these characteristics are derived experimentally.

Figure 7:
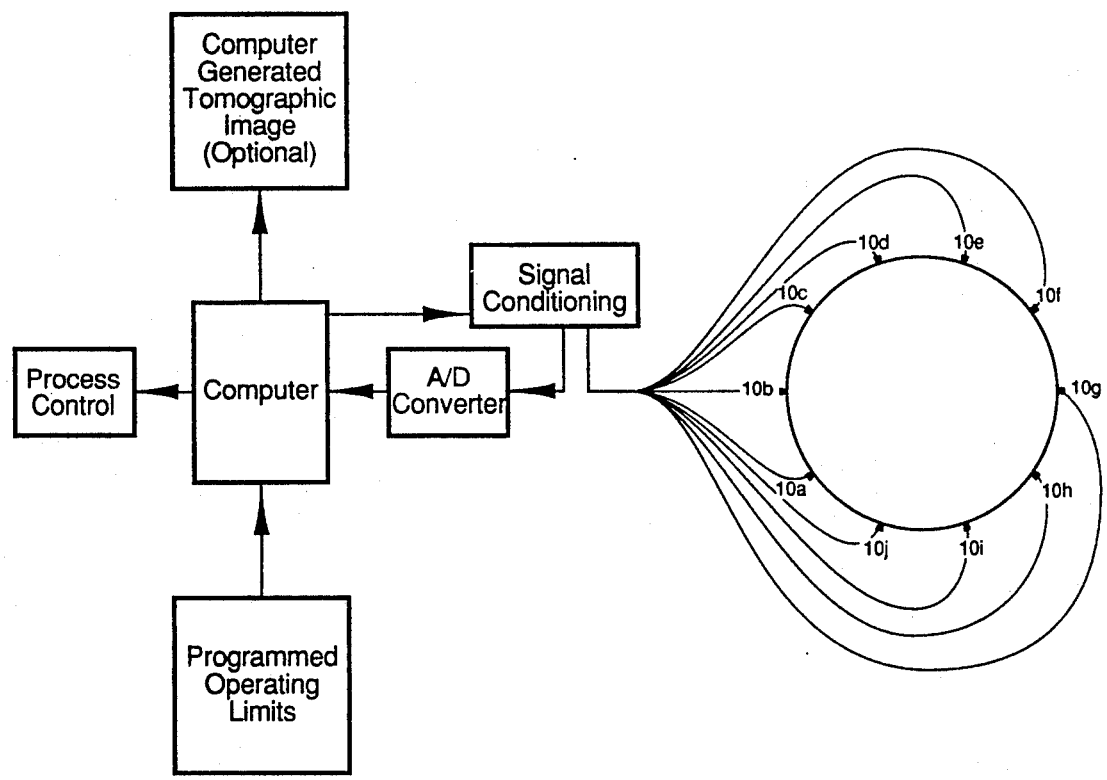
FIG. 7 is a schematic diagram of the preferred embodiment of the present invention.

FIG. 7 is a schematic diagram showing the preferred embodiment of the present invention. As shown in FIG. 7, the operation of the present invention is straightforward, requiring little operator training or intervention in the process. The computer sends a signal to a signal conditioning unit which includes electronic circuitry for pulse generation, receivers, and filters. Through the signal conditioning unit the computer signal triggers the sequential transmission of ultrasonic pulses from the ultrasonic transmitting transducers $10a$–$10j$. The ultrasonic pulse travels through the specimen and is received by a receiving transducers $10a$–$10j$ which transmits an analog signal to the signal conditioning unit circuitry to prepare the signal for analog to digital conversion. The digital signal is then transmitted to the computer. The computer measures and records the flight time of each ultrasonic pulse through the specimen. The predetermined characteristics between the speed of sound and the temperature for the medium being measured have been programmed into the computer. Based upon the known flight path and the measured time of flight, the computer will then calculate the speed of the ultrasonic pulses through each cell. The calculated speed of sound through each cell can then be used to provide a tomographic image of the specimen by, for example, assigning a grey scale to for each measured speed of sound. In the preferred embodiment of the present invention, the tomographic image is not necessary to determine the internal temperature of the particulates. However, it may be desirable to have the ability to provide an image of the specimen for additional data that may be desired, such as the density distribution of the product. The computer will then compare the calculated speed of sound with the programmed temperature operating limits. The computer can also be programmed to provide process controls in the event the temperature is determined to be outside of the established range of acceptable temperatures for that medium. The process controls could include, for example, increasing the residence time in a heat exchanger or increasing the heat transfer rate.

EXAMPLE

Applicant conducted a number of experiments to verify the operation of the subject invention in multi-phase materials. In the experiments the multi-phase material was comprised of water and a solid, the solid typically being different varieties of potatoes. Food materials vary in the amount of water content and potatoes are believed to be representative of most food materials in this respect. The sound is propagated primarily through the water component of the food material's structure, but the propagation is modified by scattering and other interactions with the solid part of the structure. Potatoes are considered a worst case among food materials from the viewpoint of changes in structural properties induced by temperature, since the starch content of potatoes is a major constituent that is known to change when heated, thus changing the speed of sound through the potato.

Typical food processing techniques involve temperatures above 120° C. and therefore a pressurized apparatus was utilized in the experiments to achieve these temperatures. Coaxial cables for ultrasonic transducers and a thermocouple were passed through the boundary of the pressurized apparatus. The transducers were positioned over an adjustable experimental path, the length ranging from 25 mm to nearly 125 mm. The thermocouple was placed in the center of the food material to measure temperature. An external pressure gauge permitted a thermodynamic determination of the temperature of the water within the pressurized apparatus.

The test sensors were special high-temperature ultrasonic transducers operating at a nominal 750 kHz center frequency. This frequency was chosen from experience with difficult to penetrate materials often found in nondestructive testing applications. The effective diameter of the sound beam was approximately 15 mm.

For calibration, the pressurized apparatus was completely filled with water only. Measurements were made relative to the sound pulse transit time through the reference material (water) at a reference temperature (nominal 20° C.) to provide calibration for inter-transducer spacing. A 65 mm transducer spacing is a typical calibration. As shown in FIG. 4 the ultrasonic pulse transit time shows a maximum speed of sound at 73° C. with a measurement precision of ±0.22° C.

Ultrasonic sensitivity of the system over the temperature range showed only a slight change, dropping less than 5% at 115° C. In water, a medium with low ultrasonic attenuation, it was observed that both the through-transmission signal and pulses make one or more round trips between transducers. Up to 12 such multiples were observed in these experiments, indicating good signal/noise ratio and transducer alignment.

Subsequent measurements were made with the solid (i.e. potato) in place, over a temperature range of 20° to 120° C. Transducer placement was such that the external water acted solely as a heat transfer medium, the effective sound path was entirely in the solid. FIG. 5 represents typical transit time results relative to the temperature for potatoes.

From these experiments it was observed that the speed of sound in the potato was a few percent higher than that of water at any temperature and that the attenuation of the sound beam in the potato does not appear to be a significant problem at any temperature. It was also observed that starch gelling hardened the food material structure, thereby raising the speed of sound, but this change was completed at temperatures well below those of interest in food processing. The curve of speed of sound versus temperature for potatoes approximately parallels that of water above about 110° C., and has adequate slope and reproducibility to permit temperature measurements of good resolution.

It was further observed that thermal gradient effects indicated a slightly lower temperature for the potato than would otherwise be the case. However, specimen size would be smaller in commercial application and the sound beam diameters would also be smaller, both of which would reduce the effect of thermal gradients. A permanent increase in transit time, amounting to one to two percent, was found in all samples upon cooling to room temperature after heating. This is due to a hardening or strengthening of the solid structure by the gelling of starch. No significant differences between potato varieties were noted.

Tomographic reconstruction can be performed using a large number of known algorithms. Each has its own advantages for one or more application, but there is not known general analytical method for determining the best algorithm for all applications. Applicant's approach, therefore, was to perform a number of numerical "experiments" by building and varying a mathematical model of a typical sensor system which can be used to derive guidelines for the sensor design.

Any tomographic reconstruction algorithm has a certain amount of what is called "modelling noise" associated with it. The modelling noise is related to the fact that the reconstruction squares, or other descriptions on which the image is based, are finite and the shape of an arbitrary object cannot be exactly represented by any combination of squares. The smaller the square, the less modelling noise results, however, the image also becomes more susceptible to the effects of real electronic and measurement noise. Spatial resolution, the smallest area over which the speed of sound is averaged to obtain its temperature, follows the same general rules as modelling noise. Spatial resolution affects the sensitivity of the measurement of the speed of sound and therefore the accuracy of the temperature measurement.

Figure 8:
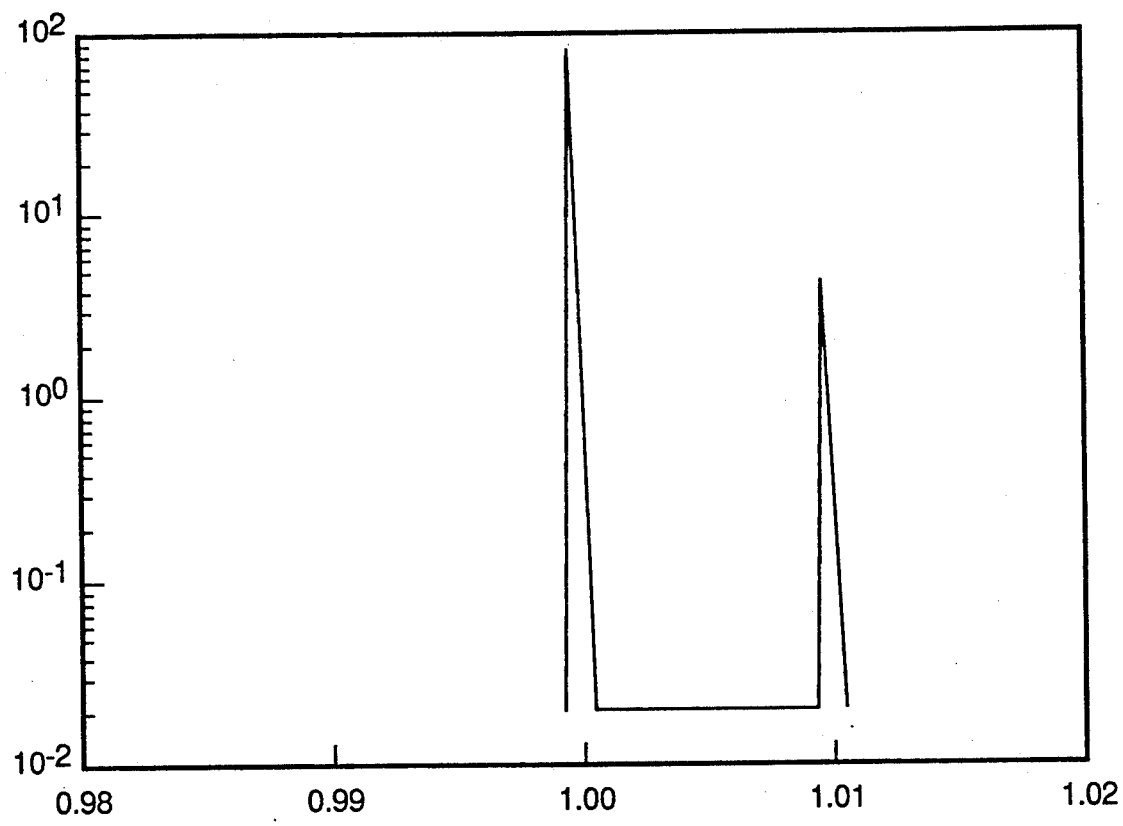
FIG. 8 is a graph representing the speed of sound in a multi-phase medium with no modelling noise.
Figure 9:
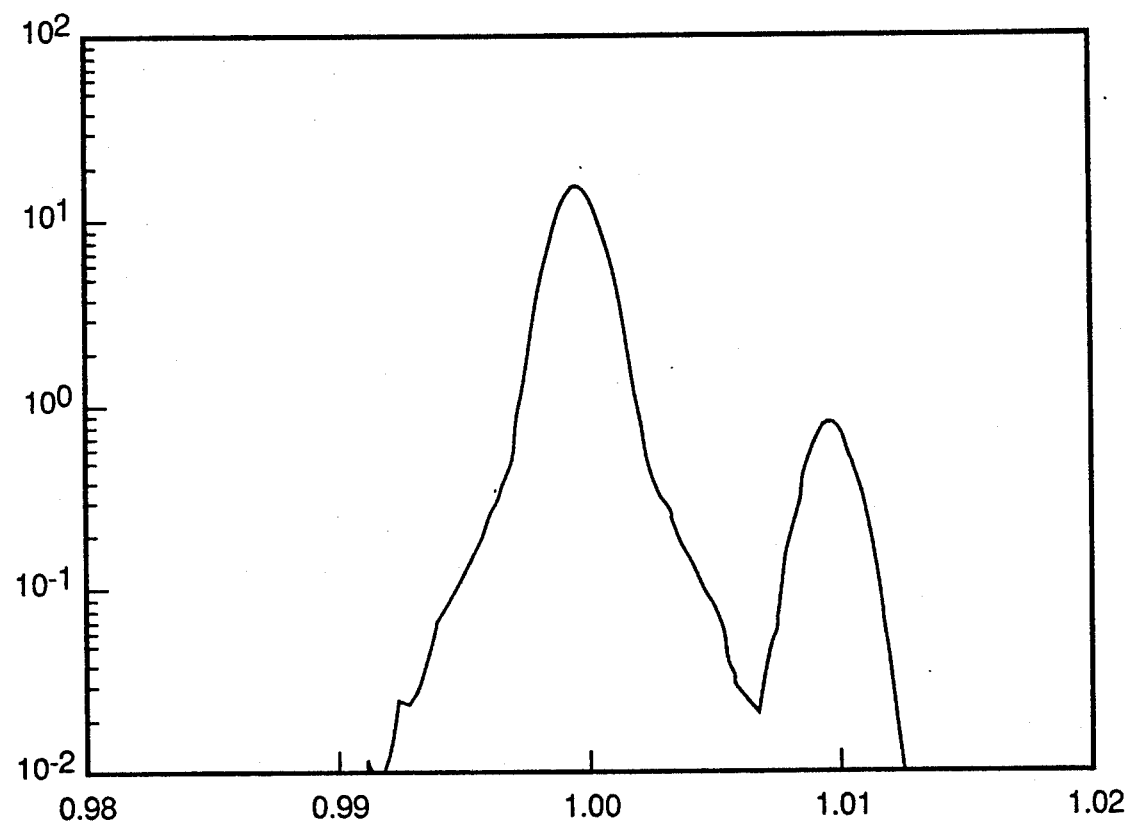
FIG. 9 is a graph representing the speed of sound in a multi-phase medium with 0.05% random modelling noise.
Figure 10:
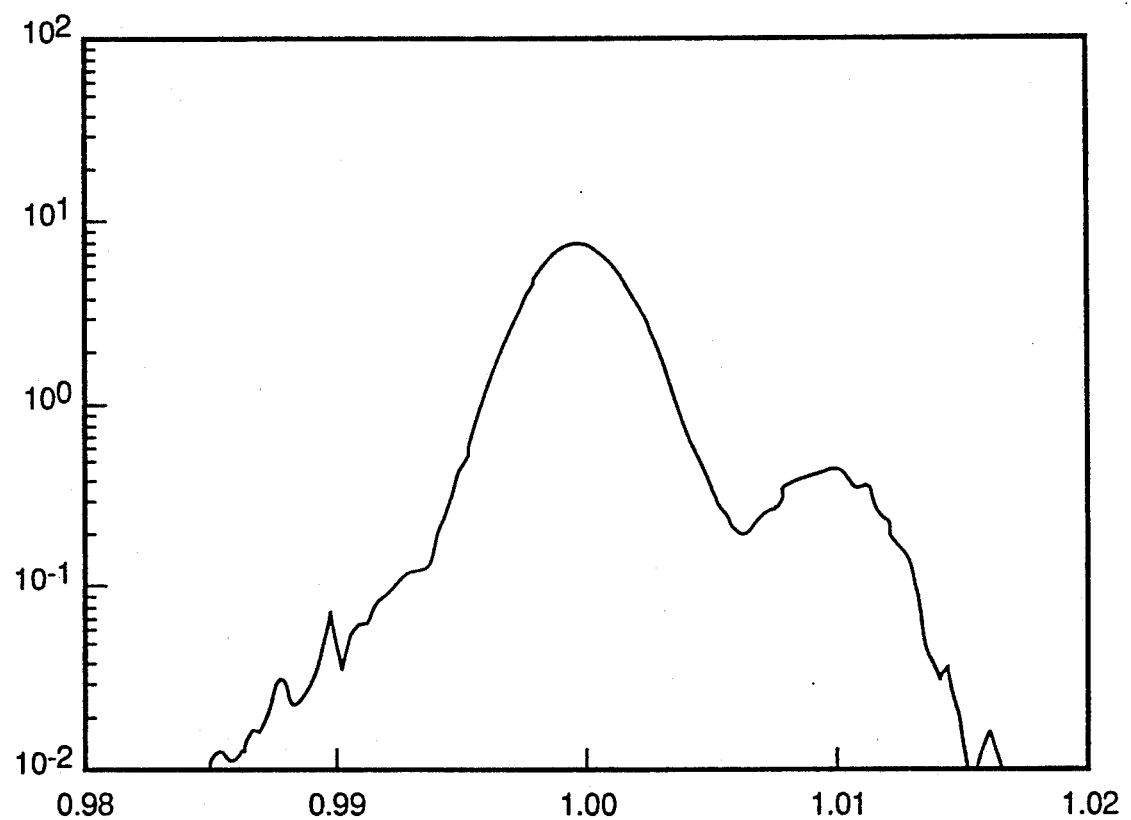
FIG. 10 is a graph representing the speed of sound in a multi-phase medium with 0.10% random modelling noise.

The numerical experiments first addressed the way in which modelling noise, which is an inherent property of every tomographic algorithm, changes with the parameters of the mathematical model for the numbers of ultrasonic transducers that have the physical size and geometry of a pipe sensor. Then spatial resolution was calculated for models, algorithms and ultrasonic pulse combinations, which tended to minimize modelling noise. Finally, Monte Carlo calculations were used to estimate the effect of measurement noise. The result is a series of curves as depicted in FIG. 8, FIG. 9 and FIG. 10. In this sequence, the Monte Carlo calculation randomly placed five circular solid objects in a background of water, wherein the speed of sound in the solid was 1% over that of the background. This approximated, for calculational purposes, the characteristics of potatoes in water that were previously established from experiments. The figures are histograms representing the number of grid squares in which the model calculated a speed of sound. Each figure represents the results of five hundred different random placements of the five circular solid objects in the measurement grid.

As shown in FIG. 8, the width of the "spikes" representing water, at a value of 1.0 for the speed of sound, and "potato" at 1.01 are measures of the modelling noise. FIG. 9 shows the effects of an addition of 0.05% random electrical noise and FIG. 10 represents the random addition of 0.10% electrical noise. From these figures it is apparent that modelling noise can be minimized to within the limitations of known algorithms and ultrasonic transducer characteristics and numbers.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method of determining the temperature throughout a multi-phase medium on the basis of speed of sound tomography, the steps comprising:
    establishing sectors throughout a cross-sectional portion of a multi-phase specimen;
    positioning ultrasonic transducers around the specimen such that multiple ultrasonic pulse flight paths traverse each established sector;
    transmitting multiple ultrasonic pulses by said ultrasonic transducers through each sector of the specimen;
    receiving said ultrasonic pulses which have travelled the established flight paths through said sectors of the specimen;
    identifying, measuring and recording the transit time of each ultrasonic pulse through said specimen;
    calculating the speed of sound through said sectors of the specimen;
    correlating a temperature in said sectors of the multi-phase specimen to said calculated speed of sound based upon established characteristics between speed of sound and temperature for said specimen.

2. The method of claim 1 wherein said ultrasonic pulse is in the frequency range of 20 kHz to 100 MHz.

3. The method of claim 1 wherein a computer is used to control the transmission and receipt of said ultrasonic pulses.

4. The method of claim 1 wherein said identifying, measuring and recording of the transit time of each ultrasonic pulse is performed by a computer.

5. The method of claim 1 wherein a computer is used to calculate the speed of sound through said sectors, said computer being programmed to correlate a temperature to said speed of sound for said specimen.

6. An apparatus for performing the method of ultrasonic tomography for in-process measurements of temperature in a multi-phase medium, comprising:
    a. transducer means for emitting multiple ultrasonic pulses through sectors of a multi-phase medium specimen;
    b. transducer means for receiving said multiple ultrasonic pulses;
    c. means for measuring and recording the transit time of said ultrasonic pulses through said sectors of the multi-phase medium specimen;
    d. means for determining the speed of sound through each sector and correlating said speed of sound to a temperature for any sector in the multi-phase medium specimen.

7. The apparatus of claim 6 wherein said transducer means for transmitting and receiving said ultrasonic pulses is controlled by a computer.

8. The apparatus of claim 6 wherein said means for measuring and recording transit times of said ultrasonic pulses is a computer.

9. The apparatus of claim 6 wherein said means for determining the speed of sound and correlating said speed of sound to a temperature is a computer which has been programmed with predetermined characteristics of the speed of sound and temperature through said specimen.

10. The apparatus of claim 6 further comprising means for the tomographical imaging of the speed of sound through said multi-phase medium specimen.

* * * * *